No. 610,069. Patented Aug. 30, 1898.
A. LE BLANC.
CANE CUTTER.
(Application filed Oct. 25, 1897.)
(No Model.)
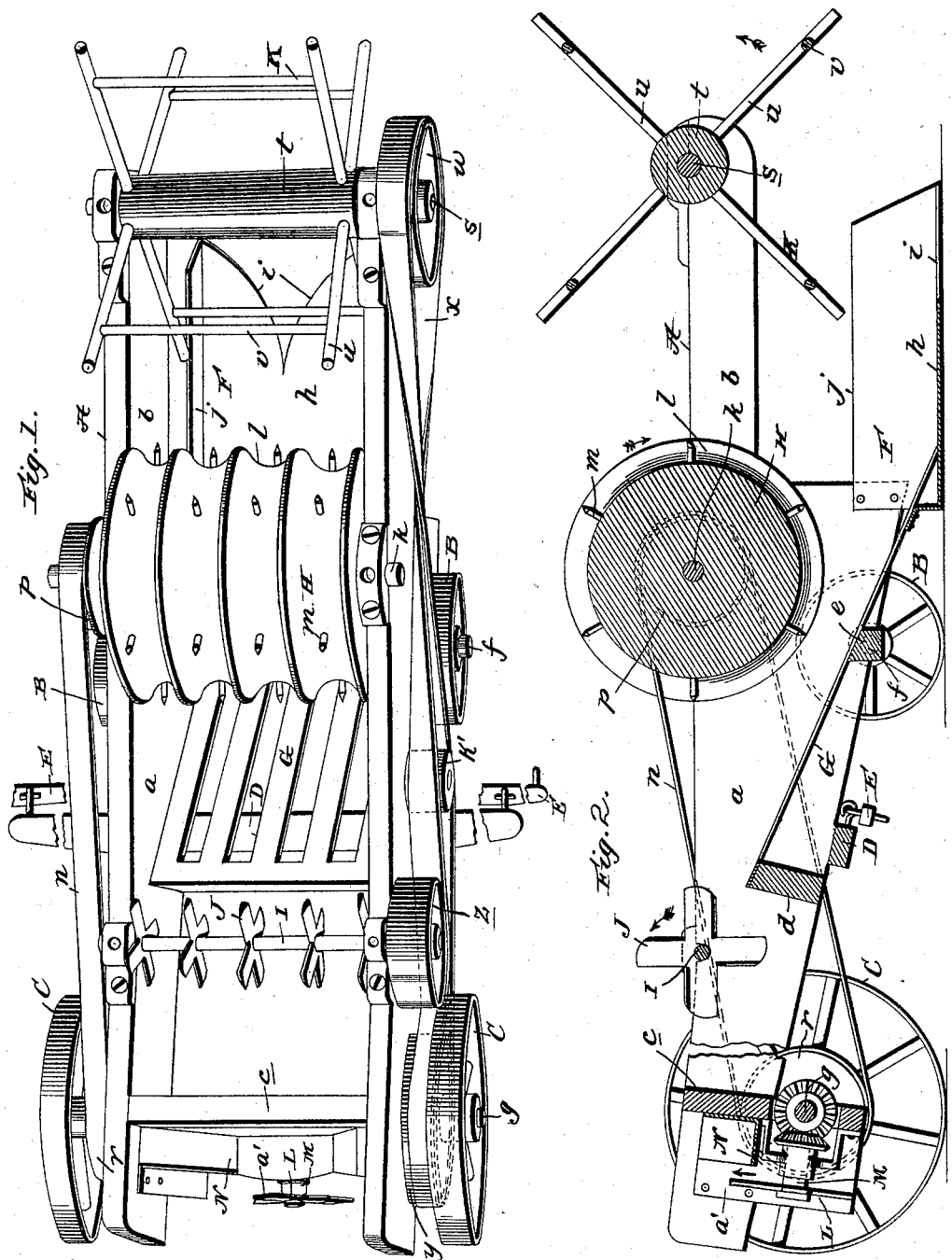

UNITED STATES PATENT OFFICE.

ALFIO LE BLANC, OF NEW ORLEANS, LOUISIANA.

CANE-CUTTER.

SPECIFICATION forming part of Letters Patent No. 610,069, dated August 30, 1898.

Application filed October 25, 1897. Serial No. 656,334. (No model.)

*To all whom it may concern:*

Be it known that I, ALFIO LE BLANC, a citizen of the United States, residing at New Orleans, in the parish of Orleans and State of Louisiana, have invented certain new and useful Improvements in Cane-Cutters; and I do declare the following to be a full, clear, and exact description of the invention, such as will enable others skilled in the art to which it appertains to make and use the same.

My invention relates to machines for harvesting sugar-cane and the like, and it will be fully understood from the following description and claims when taken in conjunction with the annexed drawings, in which—

Figure 1 is a top perspective view of my improved machine, and Fig. 2 is a longitudinal vertical sectional view of the same.

Referring by letter to the said drawings, A designates the main frame of the machine, which is preferably made of wood. This frame may be of any construction suitable to the purposes of my invention, but I prefer to have it comprise the side walls $a$, with the downwardly and forwardly inclined lower edges and the forwardly-extended reduced portions $b$, the cross-bar $c$, connecting the walls $a$ at a point adjacent to their rear ends, the cross-bar $d$, arranged in advance of the bar $c$ and at about the elevation shown, and the cross-bar $e$, arranged in advance of the bar $d$ and in a horizontal plane below the same, as illustrated. The said frame is supported by wheels B, mounted on spindles $f$, which may be and preferably are extensions of the bar $e$, and it is also supported by the drive-wheels C, which are preferably fixed on a shaft $g$, journaled in suitable bearings in the frame for a purpose presently described. In the preferred embodiment of the invention the frame A is provided with a transverse fixedly-connected beam D, to the extended ends of which singletrees E are attached for the connection of draft-animals, the said animals being designed to travel at the side of the forward portion of the machine and draw the same through a field of cane.

F designates the cane-cutter, which is preferably made of sheet-steel. This cutter is fixedly connected to the forward end of the frame A, and it comprises the horizontal plate $h$, which rests close to the ground and has its forward end bifurcated and provided with the slightly convex cutting edges $i$ and the side flanges $j$, which rise from said bottom plate and are designed to prevent lateral deflection of the cut cane off the plate.

G designates a fixed apron which extends the full width of the machine and preferably comprises a plurality of parallel slats arranged such a distance apart as to prevent the cane from falling between the same. This apron is connected to the bottom plate $h$ and to the transverse frame-bars $d\ e$, and it affords an inclined plane up which the cane may be expeditiously moved by a rotary drum, as H. The said drum is fixed on a shaft journaled in the frame at such a height as to bring the periphery of the drum sufficiently near the apron to enable it to properly engage the cane, and it is provided in its periphery with circumferential grooves $l$, and has radial barbs $m$, arranged in said grooves, as shown, the said grooves having for their purpose to receive and guide the stalks of cane, so that the same will take a straight course up the apron, while the barbs are adapted to engage the cane so as to enable the drum to positively move the same up the apron. In the present embodiment of the invention the drum H is rotated in the direction indicated by arrow through the medium of a belt $n$, which takes around a pulley $p$ on shaft $k$, and a pulley $r$, fixed with respect to one of the drive-wheels C; but it is obvious that the said drum may be driven through the medium of any suitable gearing without departing from the scope of my invention.

Disposed immediately in rear of the upper end of the apron G and at a proper elevation to enable the cane to pass over it is a shaft I, which is provided at intervals in its length with cutters J. The said cutters may be of any suitable construction, but I prefer to have them each comprise four (more or less) blades, as shown, as such construction is best suited to perform the function for which the cutters are designed—viz., to strip the foliage off the stalks of cane as the same pass rearwardly over the shaft I and between the cutters.

K designates a reel for pressing down the cane in advance of the fixed cutter F. This reel is fixed on a shaft $s$, journaled in the bars b of the frame A, and it preferably comprises a hub t, radial arms u, extending from the hub adjacent to the ends thereof, and cross-bars v, connecting said arms u, the said cross-bars v being arranged at about the distance shown from the outer ends of the arms, so as to enable the outer portions of the arms to receive the cane between them and prevent lateral deflection of the same when it is depressed by the reel. The shaft of the reel is provided with a pulley w, and it is designed to be rotated in the direction indicated by arrow (see Fig. 2) through the medium of a belt x, which takes around a pulley y, fixed with respect to one of the drive-wheels C and is twisted, as shown. The said belt x also engages a pulley z, fixed on the cutter-shaft I, so as to rotate the cutters J in the direction indicated by arrow, and it preferably passes above and below an idler-pulley K', which has for its purpose to guide the belt and hold it in proper contact with the pulley z.

L designates a rotary cutter, which preferably comprises blades a' and has for its function to "top"—i. e., cut off the tops of the canestalks. This cutter L is disposed at right angles to the length of the machine and is fixed on a shaft M, the said shaft being disposed longitudinally of the machine and being connected by suitable gearing, such as shown, with the shaft g of the drive-wheels, so that when the machine is in motion the cutter L will be rotated at a high rate of speed in the direction indicated by arrow. For the purpose of supporting the top ends of the canestalks while the same are being "topped" I provide the shelf N, which is connected to the frame-bar c, as shown.

In the practical operation of the machine it is hauled across a field of cane by draft-animals, as before described. As it progresses the reel K, rotating in the direction indicated by arrow, presses the cane down in a direction away from the forward end of the machine. While the cane is thus pressed downwardly, it will be engaged and cut by the cutter F, which is arranged close to the ground, and will then be scooped up by said cutter with its "ground" ends toward the rear. It will also be seen that the forward movement of the machine will result in the ground ends of the cane being carried a slight distance up the apron G. In this position the cane is engaged by the drum H and moved up the apron G and over the shaft I between the cutters J, the grooves of the drum and the spaces between the cutters J being preferably arranged in alinement to insure the passage of the cane between the cutters, which serve to strip the cane of its foliage. The stalks of cane are moved up the apron G and over the shaft I continuously, and in consequence it will be seen that after the cane passes between the cutters J it will be pushed rearwardly by the following cane and shoved over the rear end of the frame. As the top ends of the cane leave the rear bar c of the frame, which is arranged at about the distance shown above the rotary knife L, they will fall upon the shelf N and will be cut off by the rotating knife L and dropped with the remainder of the cane in the path of the machine. From this it will be seen that the direction of rotation of the reel K plays an important part, as otherwise the top ends of the canestalks would reach the rear end of the machine first.

It will be appreciated from the foregoing that while very cheap and simple my improved machine not only cuts but prepares the cane for the mill, which materially lessens the number of handlings of the cane, and consequently the cost of getting it to the mill.

Having thus described my invention, what I claim is—

1. A machine for harvesting cane comprising a main frame, a cutter connected to the frame and adapted to cut the cane near the ground, a suitable apron extending upwardly and rearwardly from the cutter, a rotary drum arranged above the apron and having circumferential grooves for guiding the cane, and radial barbs arranged in said grooves and a suitable means for rotating the drum, substantially as specified.

2. A machine for harvesting cane comprising a main frame, a cutter connected to the frame and adapted to cut the cane near the ground, a suitable apron extending upwardly from the cutter, a suitable means for moving the cane up the apron, a transverse shaft arranged in rear of the upper end of the apron, cutters fixed on said shaft at intervals in its length and disposed in the direction of the length of the machine, and suitable means for rotating the shaft, substantially as specified.

3. A machine for harvesting cane comprising a main frame, a cutter connected to the frame and adapted to cut the cane near the ground, a suitable apron extending upwardly and rearwardly from the cutter, a rotary drum arranged above the apron and having circumferential grooves for guiding the cane and radial barbs in said grooves, means for rotating said drum, a transverse shaft arranged in rear of the upper end of the apron, cutters fixed on said shaft at intervals in its length and disposed in the direction of the length of the machine; the spaces between said cutters being arranged in alinement with the circumferential grooves of the drum, and a suitable means for rotating the cutter-shaft, substantially as specified.

4. A machine for harvesting cane comprising a main frame, a cutter connected to the frame having the rear transverse bar c and adapted to cut the cane near the ground; a reel arranged above and in advance of the cutter, means for rotating said reel so as to enable it to depress the cane in a direction away from the forward end of the frame, an apron extending upwardly and rearwardly from the cutter, means for moving cane up said apron, a transverse shaft arranged in rear of the upper end of the apron, cutters fixed on said shaft at intervals in its length and disposed in the direction of its length, means for rotating said cutter-shaft, and a cutter arranged in rear of the series of cutters and disposed at right angles to the length of the machine and in a plane below the upper edge of the frame-bar $c$; said cutter being fixed on a shaft and rotated by suitable means, substantially as specified.

5. In a cane-harvester, the combination of a main frame having a transverse bar at its rear end, a shelf connected to the rear side of said bar below the upper edge thereof, a longitudinally-disposed shaft journaled below the shelf and carrying a transversely-disposed cutter, suitable means for rotating said cutter and suitable means for feeding the cane rearwardly over the rear transverse bar of the frame, substantially as specified.

In testimony whereof I affix my signature in presence of two witnesses.

ALFIO LE BLANC.

Witnesses:
 D. A. THIBAU,
 SIDNEY ROBINSON.